United States Patent [19]

Irwin

[11] Patent Number: 5,784,038
[45] Date of Patent: Jul. 21, 1998

[54] COLOR PROJECTION SYSTEM EMPLOYING DUAL MONOCHROME LIQUID CRYSTAL DISPLAYS WITH MISALIGNMENT CORRECTION

[75] Inventor: Dean Irwin, Novato, Calif.

[73] Assignee: WAH-III Technology, Inc., Novato, Calif.

[21] Appl. No.: 547,150

[22] Filed: Oct. 24, 1995

[51] Int. Cl.$^6$ ........................................ G09G 3/36
[52] U.S. Cl. ........................ 345/88; 345/32; 348/743
[58] Field of Search ...................... 345/32, 88; 348/743, 348/745, 747, 751; 349/8; 359/554, 557

[56] References Cited

U.S. PATENT DOCUMENTS 5,612,753  3/1997  Poradish et al. ..................... 348/743

OTHER PUBLICATIONS

"A 128 ×128 matrix electrially addressed ferroelectric liquid crystal spatial light modulator", Sparks et al, IEEE Colloq. (1988) No. 121; Optical Interconnects.

"Spatial light modulators for optical computing and information processing", Efron, System Sciences, 1989 Annual Hawaii Int'l. Conference, vol. I.

Primary Examiner—Jeffery Brier
Attorney, Agent, or Firm—Gray Cary Ware & Freidenrich

[57] ABSTRACT

A color projection system employs dual monochrome active matrix LCDs synchronized with corresponding color wheels such that a display controller responsive to an RGB signal causes pixels of each monochrome active matrix LCD, corresponding to a color of the pixels of a frame to be projected onto a screen display, to be transparent when those pixels are projected through a window of its corresponding color wheel of that color, wherein the color wheels rotating at the same angular velocity, interpose their windows of red, green, and blue into respective optical paths between their respective monochrome active matrix LCDs and the screen display, in a repetitive sequence 180 degrees out of phase with each other. An angled sheet of transparent material may be inserted into the optical path in order to correct misalignment of the monochrome images.

8 Claims, 9 Drawing Sheets

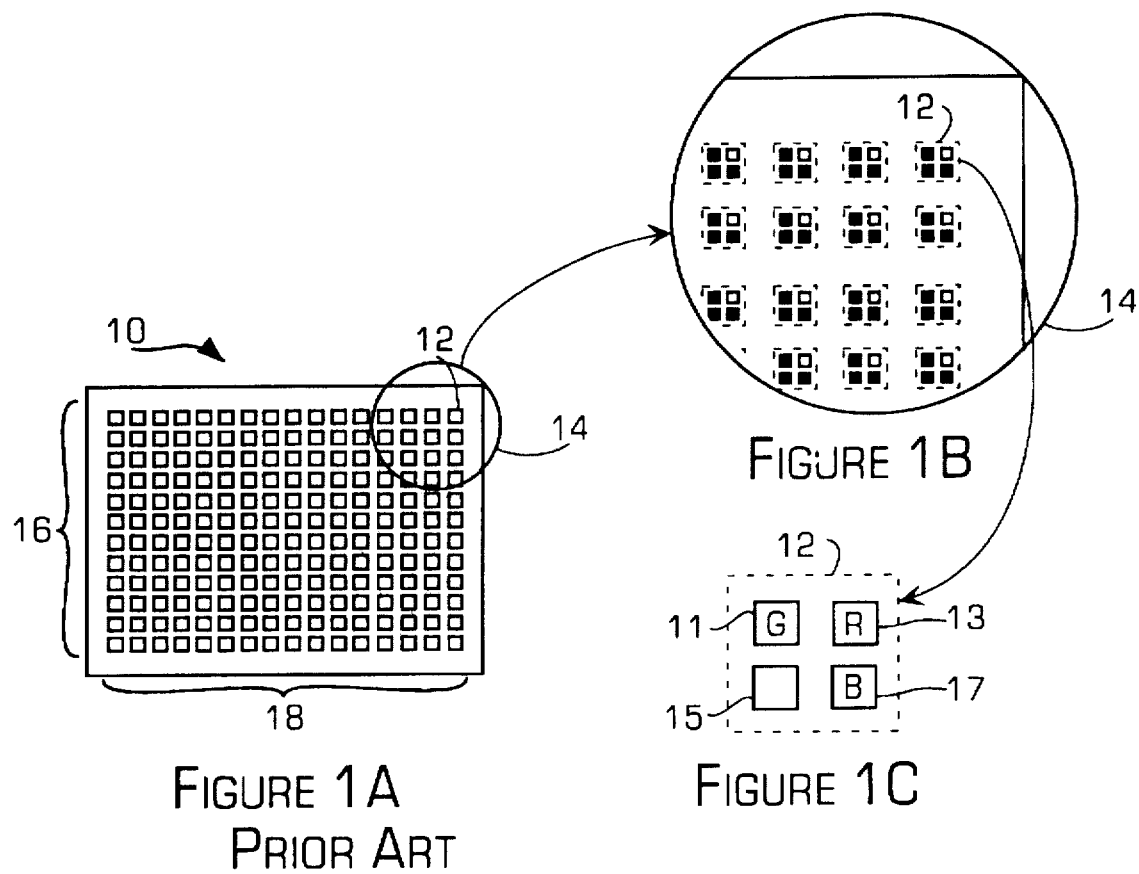
FIGURE 1A
PRIOR ART
FIGURE 1B
FIGURE 1C
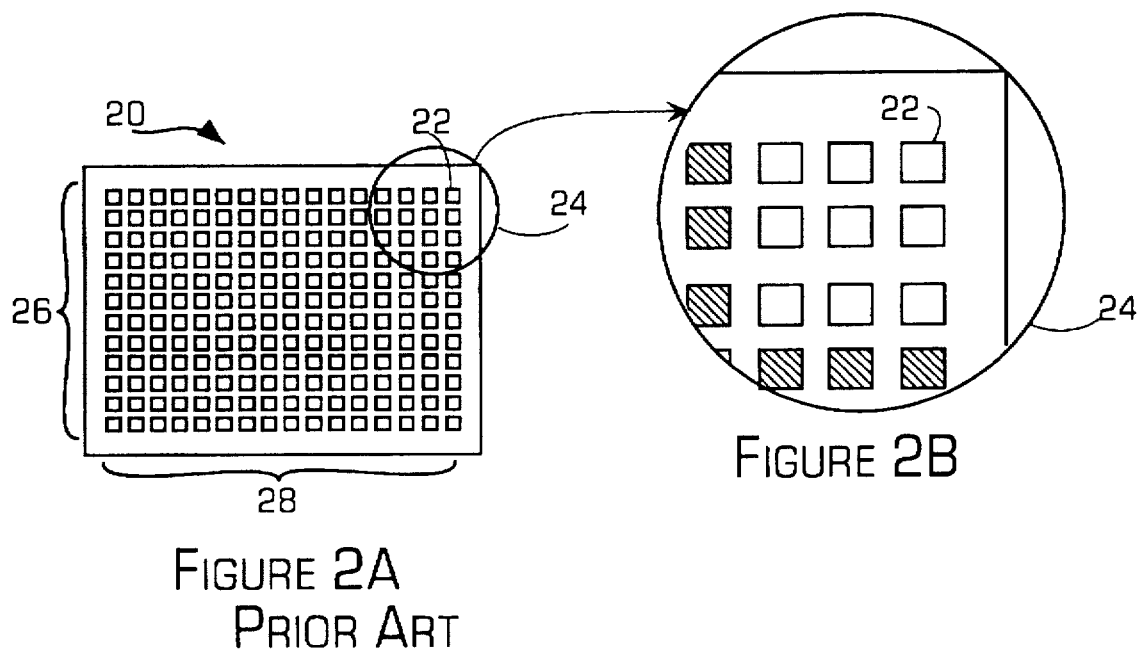
FIGURE 2A
PRIOR ART
FIGURE 2B

COLOR PROJECTION SYSTEM EMPLOYING DUAL MONOCHROME LIQUID CRYSTAL DISPLAYS WITH MISALIGNMENT CORRECTION

BACKGROUND OF THE INVENTION

This invention relates in general to color projection systems and in particular, to color projection systems employing liquid crystal displays.

Color projection systems employing liquid crystal displays ("LCDs") generally employ conventionally constructed color dot matrix LCDs of either the passive or active matrix type. One problem with the passive type of color LCDs is that their response times are relatively slow, thus making them generally unsuitable for video or animation. Spatially modulated active matrix type color LCDs, on the other hand, commonly exhibit poor light efficiency characteristics, resulting in low intensity images being projected onto a screen.

FIGS. 1a–1c illustrate, as a simplified example, a front view of a conventional active matrix color LCD 10. In FIG. 1a, the color display 10 is shown having a plurality of pixels organized into a plurality of rows 16 and a plurality of columns 18, wherein the number of such rows and columns are typically defined by industry standard resolutions for computer graphics displays. In FIG. 1b, an enlargement of an area 14 of the active matrix color LCD 10 is shown, wherein each of the pixels such as, for example, pixel 12, in the display area 14 is further shown to be comprised of at least three subpixels. In FIG. 1c, an enlargement of pixel 12 is shown, wherein at least three of its subpixels, 11, 13, and 17, are coated with colored dye materials, such as dichroics, which allow light of only one color to pass through. The pixel 12 may also include a fourth subpixel 15. Subpixel 11 is coated with a material allowing only the color green to pass through, subpixel 13 is coated with a material allowing only the color red to pass through, and subpixel 17 is coated with a material allowing only the color blue to pass through.

When the pixel 12 of the active matrix LCD 10 is to be a red color, a display controller (not shown) turns on subpixel 13 and turns off subpixels, 11, 15 and 17, for example, so that light only passes through the subpixel 13 and consequently, appears red. In a similar manner, when the pixel 12 is to be a green color, the display controller turns on pixel 11 and turns off subpixels, 13, 15, and 17, so that light only passes through the subpixel 11 and consequently, appears green. Likewise, when the pixel 12 is to be a blue color, the display controller turns on pixel 17 and turns off subpixels, 11, 13, and 15, so that light only passes through the subpixel 17 and consequently, appears blue.

The light efficiency of the color images displayed on the color active matrix LCD 10 may be poor, however, because light passes through only a percentage of the display surface. In particular, when each of the pixels in the display area 14 are to be one of the colors red, green, or blue, only one out of every four subpixels of every pixel in the area 14 is turned on, thus allowing, at the most, only one fourth of the light to pass through the display area 14. FIG. 1b, is illustrative, for example, where each of the pixels in the display area 14 are to be the color red. As a consequence, when employing such color active matrix LCDs in a color projection system, their poor light efficiency characteristics may be magnified in effect, resulting in low intensity or brightness images being projected onto a screen by the color projection system.

OBJECTS AND SUMMARY OF THE INVENTION

Accordingly, a primary object of the present invention is to provide an LCD based color projection system having superior light efficiency characteristics.

Another object is to provide a relatively low cost LCD based color projection system.

These and other objects are accomplished by the various aspects of the present invention, wherein briefly stated, one aspect of the present invention is a color projection system comprising: means (e.g., 104 and 106 in FIG. 5) for projecting optically received images; means (e.g., 132, 108, and 110 in FIG. 5) including a first liquid crystal display having a first plurality of monochrome pixels, for optically transmitting over a first optical path (e.g., 117 in FIG. 5) extending from the first liquid crystal display to the projecting means, monochrome images displayed on the first plurality of monochrome pixels of the first liquid crystal display; means (e.g., 126, 108, and 110 in FIG. 5) including a second liquid crystal display having a second plurality of pixels, for optically transmitting over a second optical path (e.g., 119 in FIG. 5) extending from the second liquid crystal display to the projecting means, monochrome images displayed on the second plurality of monochrome pixels of the second liquid crystal display; means (e.g., 112) for interposing a first repetitive sequence of red, green and blue colored windows (e.g., 115-1, 115-3, and 115-5 in FIG. 7b) into the first optical path such that the optically transmitted monochrome images displayed on the first plurality of monochrome pixels of the first liquid crystal display are converted into corresponding color images to be received by the projecting means; means (e.g., 118 in FIG. 5) for interposing a second repetitive sequence of red, green and blue windows (e.g., 121-1, 121-3, and 121-5 in FIG. 8b), 180 degrees out of phase with the first repetitive sequence, into the second optical path such that the optically transmitted monochrome images displayed on the second plurality of monochrome pixels of the second liquid crystal display are converted into corresponding color images to be received by the projecting means; and means (e.g., 138 in FIG. 5) responsive to an RGB signal, for activating selected ones of the first plurality of pixels of the first liquid crystal display corresponding to the color of the window being interposed into the first optical path by the first repetitive sequence interposing means, and selected ones of the second plurality of pixels of the second liquid crystal display corresponding to the color of the window being interposed into the second optical path by the second repetitive sequence interposing means.

Another aspect of the present invention is a method of projecting color images onto a display screen, comprising the step of synchronizing, in response to an RGB signal, the activation of selected monochrome pixels of first and second liquid crystal displays with the positions of red, green and blue windows of respectively corresponding first and second color wheels such that the red, green and blue windows of the first color wheel interposes a first optical path through which images on the first liquid crystal display are projected in such a manner as to form a sequence that is 180 degrees out of phase with a sequence formed by the red, green and blue windows of the second color wheel interposing a second optical path through which images on the second liquid crystal display are projected.

Still another aspect of the present invention is a method of projecting color images, comprising the steps of: optically transmitting over a first optical path extending from a first liquid crystal display to a projecting means, monochrome images displayed on a first plurality of monochrome pixels of said first liquid crystal display; interposing a first repetitive sequence of red, green and blue colored windows into said first optical path such that said optically transmitted monochrome images displayed on said first plurality of monochrome pixels of said first liquid crystal display are converted into corresponding color images to be received by said projecting means; optically transmitting over a second optical path extending from a second liquid crystal display to said projecting means, monochrome images displayed on a second plurality of monochrome pixels of said second liquid crystal display; interposing a second repetitive sequence of red, green and blue windows, 180 degrees out of phase with said first repetitive sequence, into said second optical path such that said optically transmitted monochrome images displayed on said second plurality of monochrome pixels of said second liquid crystal display are converted into corresponding color images to be received by said projecting means; activating, in response to an RGB signal, selected ones of said first plurality of pixels of said first liquid crystal display corresponding to the color of the window being interposed into said first optical path at the time of such activating and selected ones of said second plurality of pixels of said second liquid crystal display corresponding to the color of the window being interposed into said second optical path at the time of such activating; and projecting the optically received images transmitted over said first and second optical paths on to a display screen.

Additional objects, features and advantages of the various aspects of the present invention will be apparent from the following description of its preferred embodiments, which description would be taken in conjunction with the accompanying drawings.

BRIEF DESCRIPTION OF THE DRAWINGS

FIG. 1a illustrates, as a simplified example, a front view of a conventional dot-matrix color LCD;

FIG. 1b illustrates, as an example, a magnified view of a portion of the dot-matrix color LCD of FIG. 1a;

FIG. 1c illustrates, as an example, a magnified view of one pixel of the dot-matrix color LCD of FIG. 1a;

FIG. 2a illustrates, as a simplified example, a front view of a conventional dot-matrix monochrome LCD;

FIG. 2b illustrates, as an example, a magnified view of a portion of the dot-matrix monochrome LCD of FIG. 2a;

DESCRIPTION OF THE PREFERRED EMBODIMENT

Figure 3:
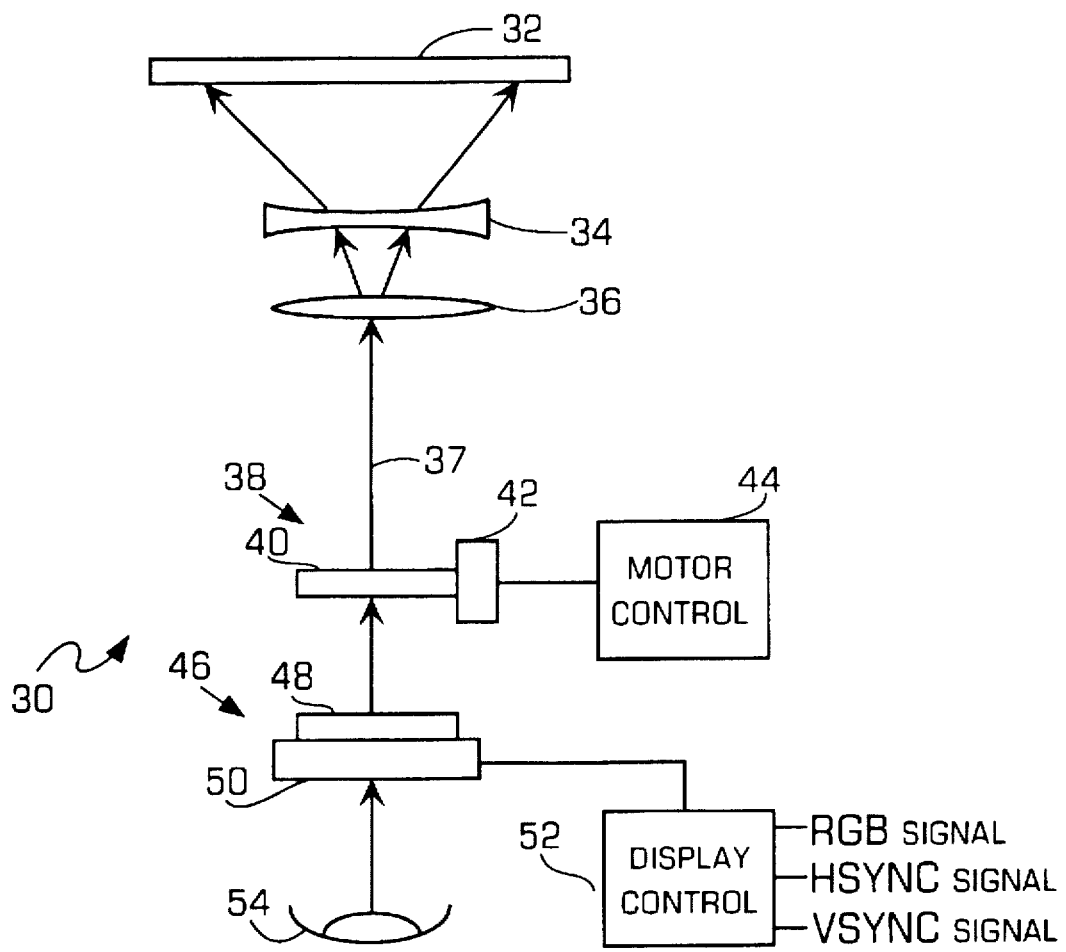
FIG. 3 illustrates, as an example, a conventional color projection system.

FIGS. 2a–2b illustrate, as a simplified example, a front view of a conventional monochrome active matrix LCD 20. In FIG. 2a, the monochrome display 20 is shown having a plurality of pixels organized into a plurality of rows 26 and a plurality of columns 28, wherein the number of rows and columns are typically defined by industry standard resolutions for computer graphics displays, and in FIG. 2b, an enlargement of an area 24 including a pixel 22 of the monochrome display 20 is shown.

By comparing the color and monochrome pixels respectively of FIGS. 1b and 2b, it is evident that approximately four times as much light may pass through an activated monochrome pixel than an activated color pixel. As a result, monochrome images displayed on the monochrome display 20 may appear much sharper in light intensity than their color counterparts displayed on the color display 10.

FIG. 3 illustrates, as an example, a color projection system 30 employing a single monochrome active matrix LCD 46. The monochrome active matrix LCD 46 is conventionally constructed as a transmissive type display including an active matrix LCD panel 48 formed of liquid crystal material sandwiched between a front glass plate and a transparent substrate, and row and column driver electronics 50 formed on the transparent substrate, for driving the pixels of the active matrix LCD panel 48. Also included in the projection system 30 are a light source 54, for backlighting the monochrome active matrix LCD 46; a color wheel assembly 38 including a color wheel 40, and a motor 42 for rotating the color wheel 40; a display controller 52 for decoding, for example, a received RGB signal along with received horizontal and vertical synchronization signals, HSYNC and VSYNC, respectively, to generate appropriate control, address, and data signals provided to the row and column driver electronics 50 of the monochrome active matrix LCD 46; a motor control circuit 44 for controlling the rotation rate of the color wheel 44; and projection lenses, 34 and 36, for projecting onto a display screen 32, color images optically transmitted to the projection lenses, 34 and 36, by the backlighted monochrome active matrix LCD 46 through the color wheel assembly 38.

Figure 4A:
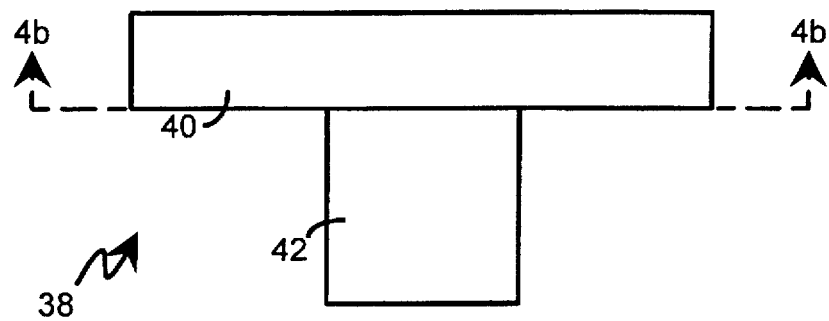
FIGS. 4a and 4b respectively illustrate, as examples, top plan and front elevational views of a color wheel useful in color projection systems such as that depicted in FIG. 3.
Figure 4B:
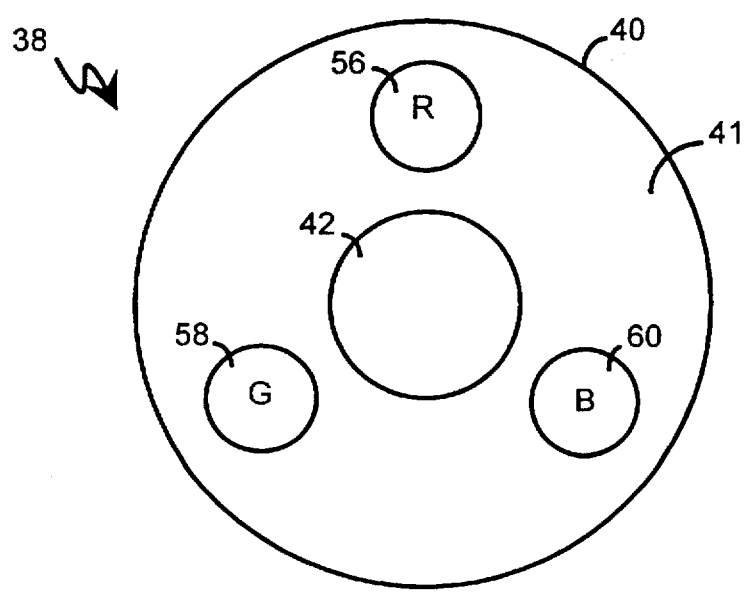

FIGS. 4a and 4b respectively illustrate, top plan and front elevational views of the color wheel assembly 38 including color wheel 40 and attached motor 42. The color wheel 40 has a doughnut shaped black body 41 with a window 56 allowing only red light to pass through it, a window 58 allowing only green light to pass through it, and a window 60 allowing only blue light to pass through it. The centers of the windows, 56, 58 and 60, are spaced 120 degrees apart around the doughnut shaped body of the color wheel 40. Consequently, if the red window 56 is initially interposed in an optical path 37 between the backlighted monochrome active matrix LCD 46 and the projection lenses, 34 and 36, then, as the color wheel 40 rotates at a constant angular velocity in the clockwise direction, the time period between the red and green windows, 56 and 58, being interposed into the optical path 37 is the same as the time period between the green and blue windows, 58 and 60, being interposed into the optical path 37, and is the same as the time period between the blue and red windows, 60 and 56, being interposed into the optical path 37. The RGB signal received by the display controller 52 defines for each frame of display data, an assigned color for each pixel of the monochrome active matrix LCD 46. The angular velocity of the color wheel 40 is selected such that it makes one complete revolution for each frame of display data. Accordingly, for a frame of display data, when the red window 56 is interposed into the optical path 37, the display controller 52, in response to the RGB signal, causes each of the pixels of the monochrome active matrix LCD 46 which are assigned to be red in that frame, to be turned on (i.e., transparent), when the green window 58 is subsequently interposed into the optical path 37, the display controller 52, in response to the RGB signal, causes each of the pixels of the monochrome active matrix LCD 46 which are assigned to be green in that frame, to be turned on, and when the blue window 60 is subsequently interposed into the optical path 37, the display controller 52, in response to the RGB signal, causes each of the pixels of the monochrome active matrix LCD 46 which are assigned to be blue in that frame, to be turned on. Since frame rates of 20–30 frames per second are commonly used in projecting video and animation images, the angular velocity of the color wheel 40 is preferably 20–30 revolutions per second, and the time period between different color windows of the color wheel 40 being interposed into the optical path 37 between the backlighted monochrome active matrix LCD 46 and the projection lenses, 34 and 36, is preferably around 11–16 milliseconds.

One problem with the color projection system 30 is that the color images that it projects tends to flicker, when using commonly available monochrome active matrix LCDs. Such flicker is believed to be caused by the slow responding LCD material of the monochrome active matrix LCDS. For example, whereas the preferred time period between different color windows of the color wheel 40 being interposed into the optical path 37, is around 11–16 milliseconds, the response times of conventionally used LCD material are typically in a range of about 12–15 milliseconds. Accordingly, the pixels associated with each color window may not be fully turned on when their respective color window is first interposed into the optical path 37, and the pixels associated with the previous color window may not be fully turned off at that time.

To avoid such a flicker problem, three separate active matrix LCDs may be used, one dedicated to each of the three colors, red, green, and blue. The images from all three active matrix LCDs may then be optically combined and projected through projection lenses such as 34 and 36, to a display screen such as 32. Such a system employing three active matrix LCDs, however, is expensive and consequently, undesirable from a commercial viewpoint.

Figure 5:
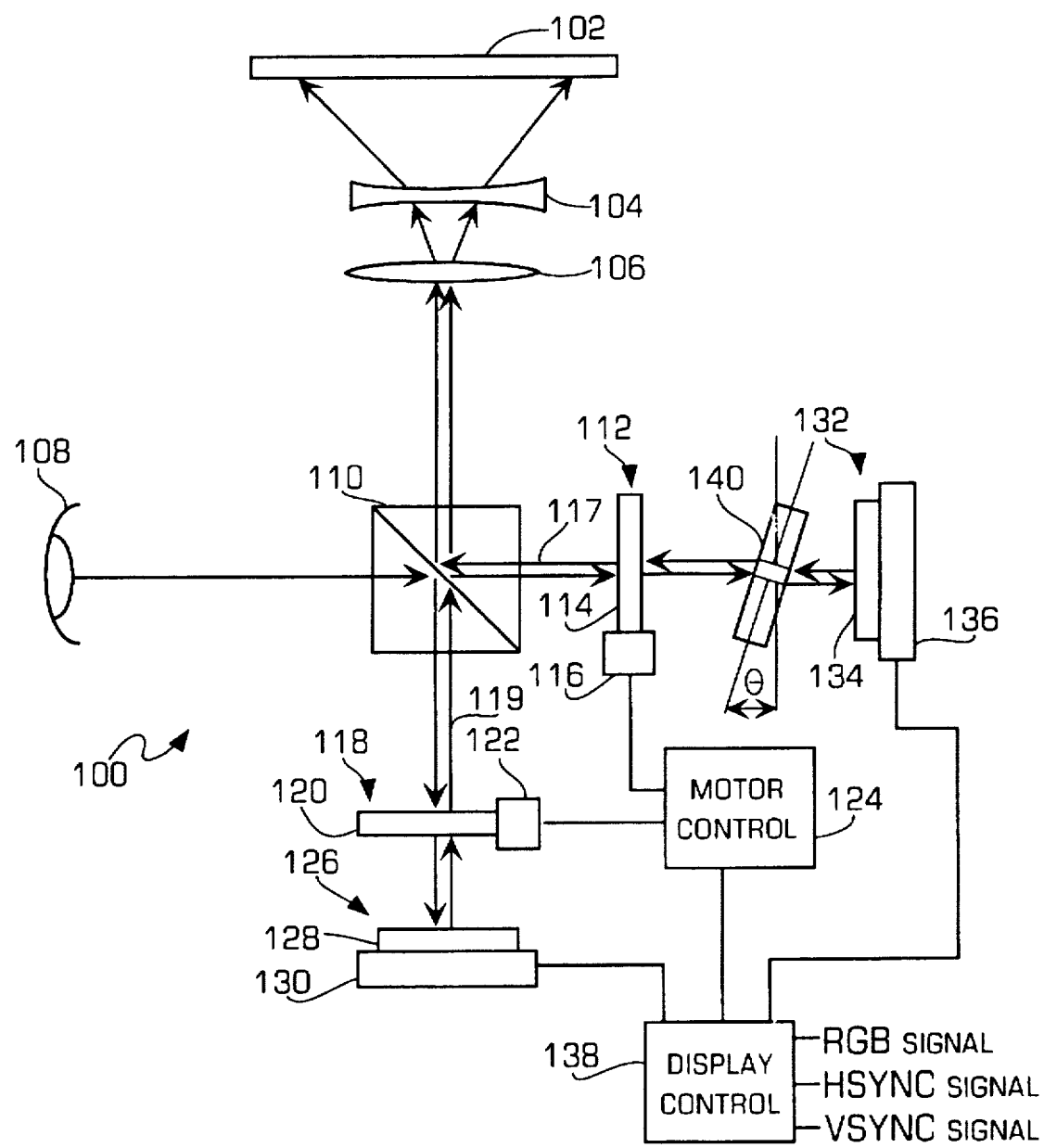
FIG. 5 illustrates, as an example, a color projection system utilizing aspects of the present invention.

FIG. 5 illustrates, as an example, a color projection system 100 employing two monochrome active matrix LCDs, 132 and 126, for projecting color images onto a screen 102. The color projection system 100 avoids the flicker problem of the color projection system 30. It is also a significantly lower cost system than a system employing three active matrix LCDs, since the major cost of such projection systems is the cost of the active matrix LCDS.

In the preferred embodiment depicted in FIG. 5, both monochrome active matrix LCDs, 132 and 126, are reflective type active matrix LCDs. Accordingly, since their respective substrates need not be transparent, their respective drive electronics, 136 and 130, may be economically formed on silicon substrates like standard integrated circuits. For additional details on such reflective type active matrix LCDS, see, e.g., U.S. Pat. No. 4,239,346, entitled "Compact Liquid Crystal Display System," which is incorporated herein by this reference.

Included in the color projection system 100 is a lamp 108 which provides light to each of the monochrome active matrix LCDs, 132 and 126, through a polarizing prism 110. The polarizing prism 110 receives the white light from the lamp 108, and passes half the light (e.g., s-plane polarity light) to the monochrome active matrix LCD 132 and half the light (e.g., p-plane polarity light) to the monochrome active matrix LCD 126. To compensate for the different light polarity that it receives, the monochrome active matrix LCD 126 preferably has reversed polarizers with respect to the monochrome active matrix LCD 132. Effectively, this means that the monochrome active matrix LCD 126 will be operating in reverse video relative to the monochrome active matrix LCD 132. By so doing, all of the white light from the lamp 108 is used without any light being wasted. The transparent mode pixels of the monochrome active matrix LCDs, 132 and 126, then allow the received light to be reflected back to the polarizing prism 110 through their respective color wheel assemblies, 112 and 118, wherein transparent mode for the pixels of the monochrome active matrix LCD 132 is achieved by turning these pixels on, and transparent mode for the pixels of the monochrome active matrix LCD 126 is achieved by turning these pixels off. Half of the thus reflected light from each of the monochrome active matrix LCDs, 132 and 126 (e.g., light being passed by their respective color wheel assemblies, 112 and 118), is then passed through the polarizing prism 110 to projection lenses, 104 and 106, and half of the reflected light from each of the monochrome active matrix LCDs, 132 and 126 (e.g., black light from both monochrome active matrix LCDs 126 and 132), is then passed through the polarizing prism 110 back to the lamp 108.

Figure 6A:
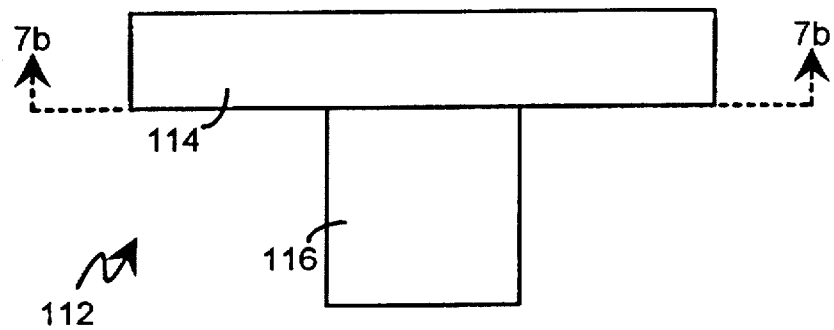
FIGS. 6a and 6b respectively illustrate, as examples, top plan and front elevational views of a color wheel useful in color projection systems such as that depicted in FIG. 5.
Figure 6B:
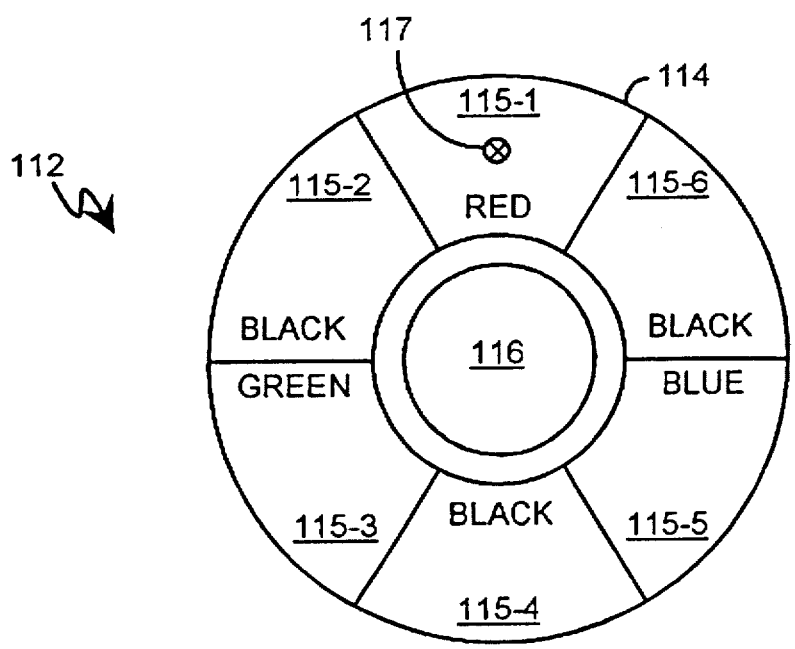
Figure 7A:
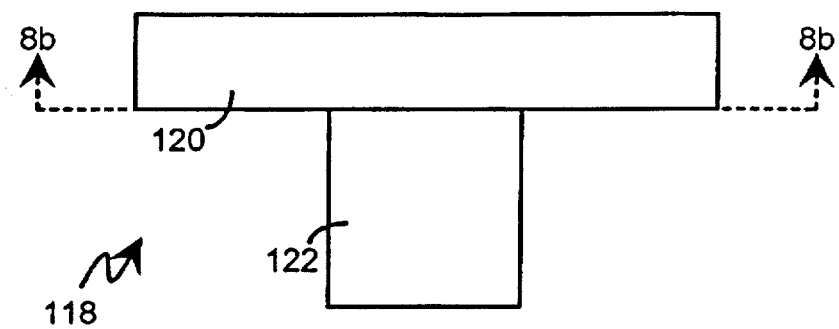
FIGS. 7a and 7b respectively illustrate, as examples, top plan and front elevational views of a color wheel which is 180 degrees out of phase with the color wheel of FIGS. 7a and 7b, and is useful in color projection systems such as that depicted in FIG. 5.

The color wheel assemblies, 112 and 118, operate in a similar manner as the color wheel assembly described with reference to FIGS. 4a and 4b. FIGS. 6a and 6b respectively illustrate a top plan view and front elevational view of the color wheel assembly 112, and FIGS. 7a and 7b respectively illustrate a top plan view and front elevational view of the color wheel assembly 118. Both color wheel assemblies, 112 and 118, include a color wheel, 114 and 120, respectively, and a motor, 116 and 122, respectively. Preferably, the motors are synchronous or stepper motors for precise control. The color wheels, 114 and 120, of both color wheel assemblies, 112 and 118, respectively, are preferably identically constructed. Both color wheels are partitioned into six pie shaped sections, three of which form color windows allowing light of a certain color to pass through, and three of which form black sections not allowing any light to pass through. Preferably, the pie shaped sections are the same size, and their center points are separated by 60 degree arcs as depicted in the FIGS. 6b and 7b.

In particular, color wheel 114 includes six pie shaped sections, 115-1 to 115-6, wherein pie shaped section 115-1 comprises a window allowing only red light to pass through it, pie shaped section 115-3 comprises a window allowing only green light to pass through it, pie shaped section 115-5 comprises a window allowing only blue light to pass through it, and pie shaped sections 115-2, 115-4, and 115-6 comprise black sections not allowing any light to pass through them. Similarly, color wheel 120 includes six pie shaped sections, 121-1 to 121-6, wherein pie shaped section 121-1 comprises a window allowing only red light to pass through it, pie shaped section 121-3 comprises a window allowing only green light to pass through it, pie shaped section 121-5 comprises a window allowing only blue light to pass through it, and pie shaped sections 121-2, 121-4, and 121-6 comprise black sections not allowing any light to pass through them.

A motor control circuit 124 controls both motors, 116 and 120, of the color wheel assemblies, 112 and 118, respectively, preferably using a feedback circuit (not shown), to ensure that the color wheels, 114 and 120, of the color wheel assemblies, 112 and 118, are synchronized to rotate at the same angular velocity. Likewise, a display controller circuit 138 controls the display driver electronics, 136 and 130, of the monochrome active matrix LCDs, 132 and 126. In a preferred embodiment, the display controller circuit 138, which may be a microprocessor, for example, also controls the motor control circuit 124 to ensure that activation of the appropriate pixels of the monochrome active matrix LCDS, 132 and 126, are synchronized with the positions of the color windows of their respective color wheel assemblies, 112 and 118. Alternatively, a separate synchronization circuit (not shown) may be included to perform this function.

Figure 7B:
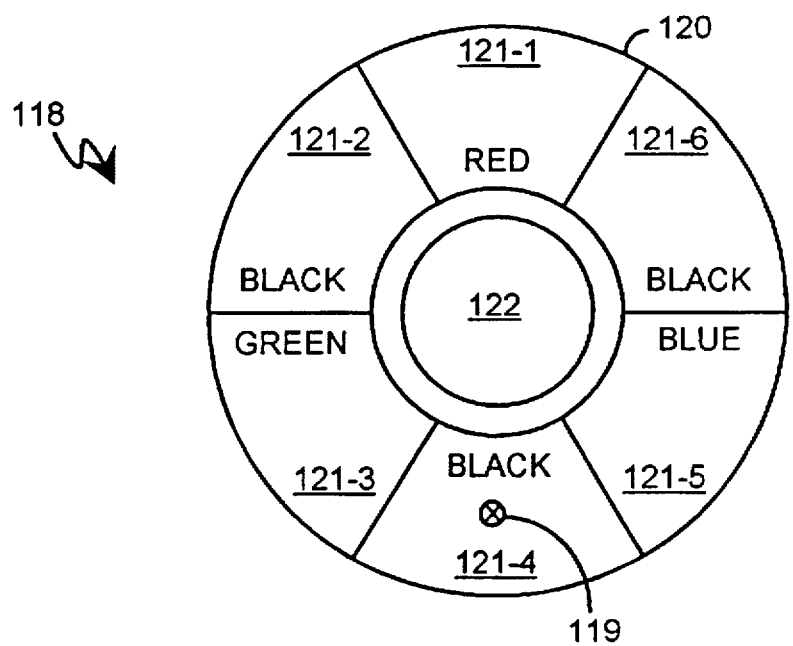

Timing of the red, green and blue color windows interposed into the optical path 117 between the monochrome active matrix LCD 132 and the projecting lenses, 104 and 106, (via the polarizing prism 110), and the red, green and blue color windows interposed into the optical path 119 between the monochrome active matrix LCD 126 and the projecting lenses, 104 and 106, (via the polarizing prism 110), is such that the two repetitive patterns of interposing color windows are 180 degrees out of phase. A simple way of accomplishing such relationship is to initially align the color wheel 114 such that the optical path 117 passes through its pie shaped sector 115-1 (as depicted in FIG. 6b), while initially aligning the color wheel 120 such that the optical path 119 passes through its pie shaped sector 121-4 (as depicted in FIG. 7b).

Figure 8:
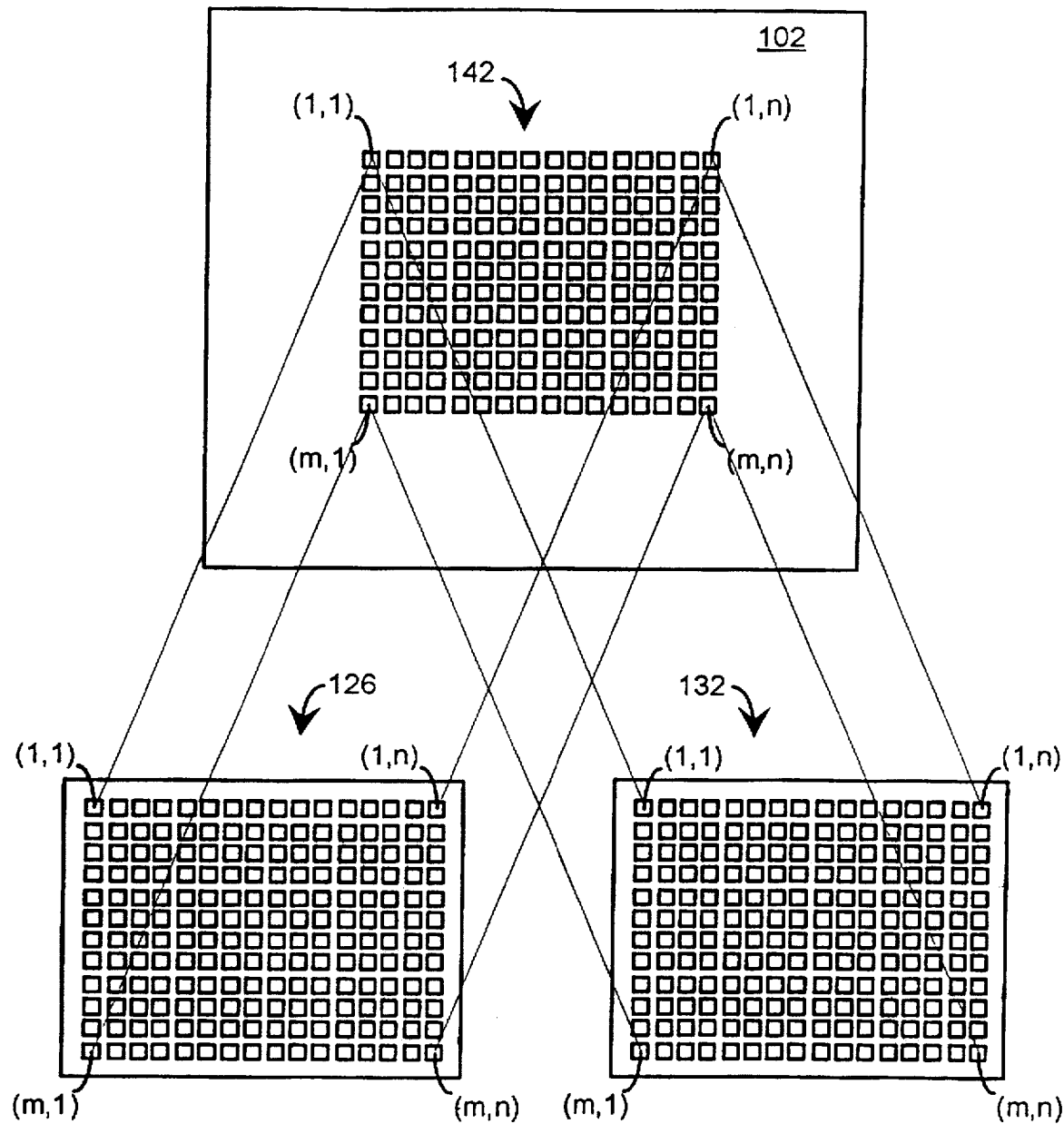
FIG. 8 illustrates, as an example, the relationship between projected images on the display screen, and the images on the two monochrome active matrix LCDs of FIG. 5.

FIG. 8 illustrates, as an example, the relationship between the images being displayed on the two monochrome active matrix LCDs, 126 and 132, and the resulting color images being projected onto the display screen 102 by the color projection system 100. The pixel resolution of the two monochrome active matrix LCDs, 126 and 132, are preferably the same. In particular, both monochrome LCDs, 126 and 132, display a plurality of monochrome pixels organized in an array of m rows and n columns. Consequently, the pixel resolution of a frame of images 142 being projected onto the display screen 102 by the color projection system 100 is also an array of m rows and n columns, wherein each pixel of the projected frame 142 is formed by optically combining light projected from corresponding pixels respectively from the two monochrome LCDs, 126 and 132. For example, a first pixel (1,1) located in a first row and first column of the projected frame 142 is formed by optically combining projected colored versions of corresponding pixels respectively from a first row and first column of the monochrome LCD 126 and the monochrome LCD 132. In similar fashion, second, third and fourth pixels, (m,1), (1,n), and (m,n), respectively located in the mth row and first column, first row and nth column, and mth row and nth column of the projected frame 142 are formed by optically combining projected colored versions of corresponding pixels respectively from the mth row and first column, first row and nth column, and mth row and nth column of the monochrome LCD 126 and the monochrome LCD 132. The colors of the pixels of the projected frame 142 are determined as previously described in reference to FIGS. 5, 6a, 6b, 7a, and 7b.

Figure 9A:
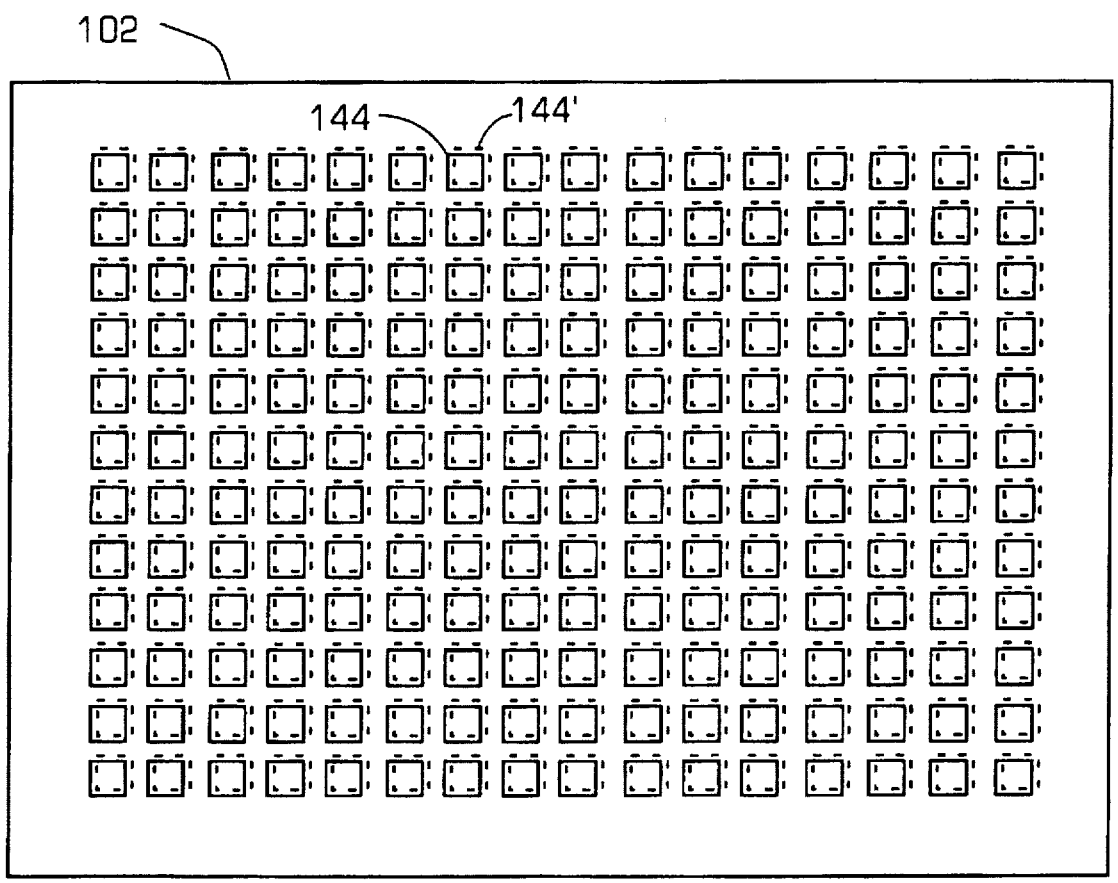
FIGS. 9a and 9b respectively illustrate, as examples, misaligned images projected on the display screen, and an expanded view of one frame pixel resulting from the misaligned images.
Figure 9B:
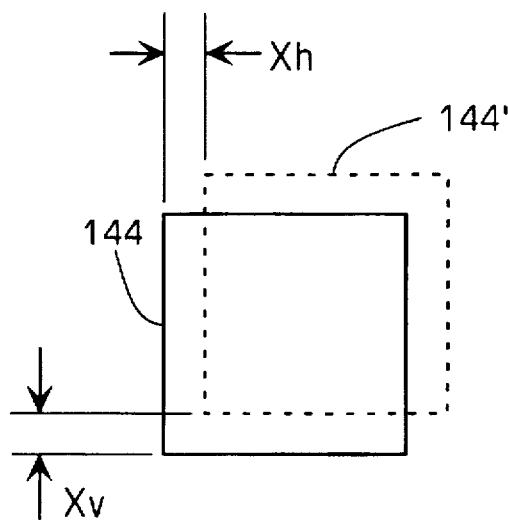

FIGS. 9a and 9b respectively illustrate, as examples, misaligned images projected onto the display screen 102 from the monochrome LCDS, 126 and 132, and an expanded view of one frame pixel resulting from the misaligned images. In particular, the solid squares depicted therein including frame pixel 144 are projected from the monochrome LCD 126, and the dotted squares depicted therein including frame pixel 144' are projected from the monochrome LCD 132. Although the two monochrome active matrix LCDS, 132 and 126, are positioned as precisely as possible, misalignment at the pixel level between their respective projected images may still occur causing a shadow or ghost effect. As depicted in FIG. 9b, the horizontal and vertical displacements of the projected images from the monochrome LCDs, 126 and 132, are respectively designated as Xh and Xv.

To correct for such misalignment, a simple glass plate 140 may also be included in the color projection system 100 to function as an alignment means at the pixel level (i.e., misalignment by less than one pixel in any direction). In particular, the refraction of a coated (MgF) glass can be used to adjust for minute differences by changing a pitch angle $\theta$ that the surface of the glass makes with a plane normal to the optical path 117, and/or a tilt or roll angle $\phi$ (not shown). The changing of the pitch angle $\theta$, for example, may change the vertical placements Xv of the pixels of the projected images from the monochrome LCD 132 relative to those of the monochrome LCD 126, and changing the roll angle $\phi$, for example, may change the horizontal placements Xh of the pixels of the projected images from the monochrome LCD 132 relative to those of the monochrome LCD 126. For misalignments greater than one pixel in any direction, alignment may be performed electronically by the display controller 138.

Figure 10:
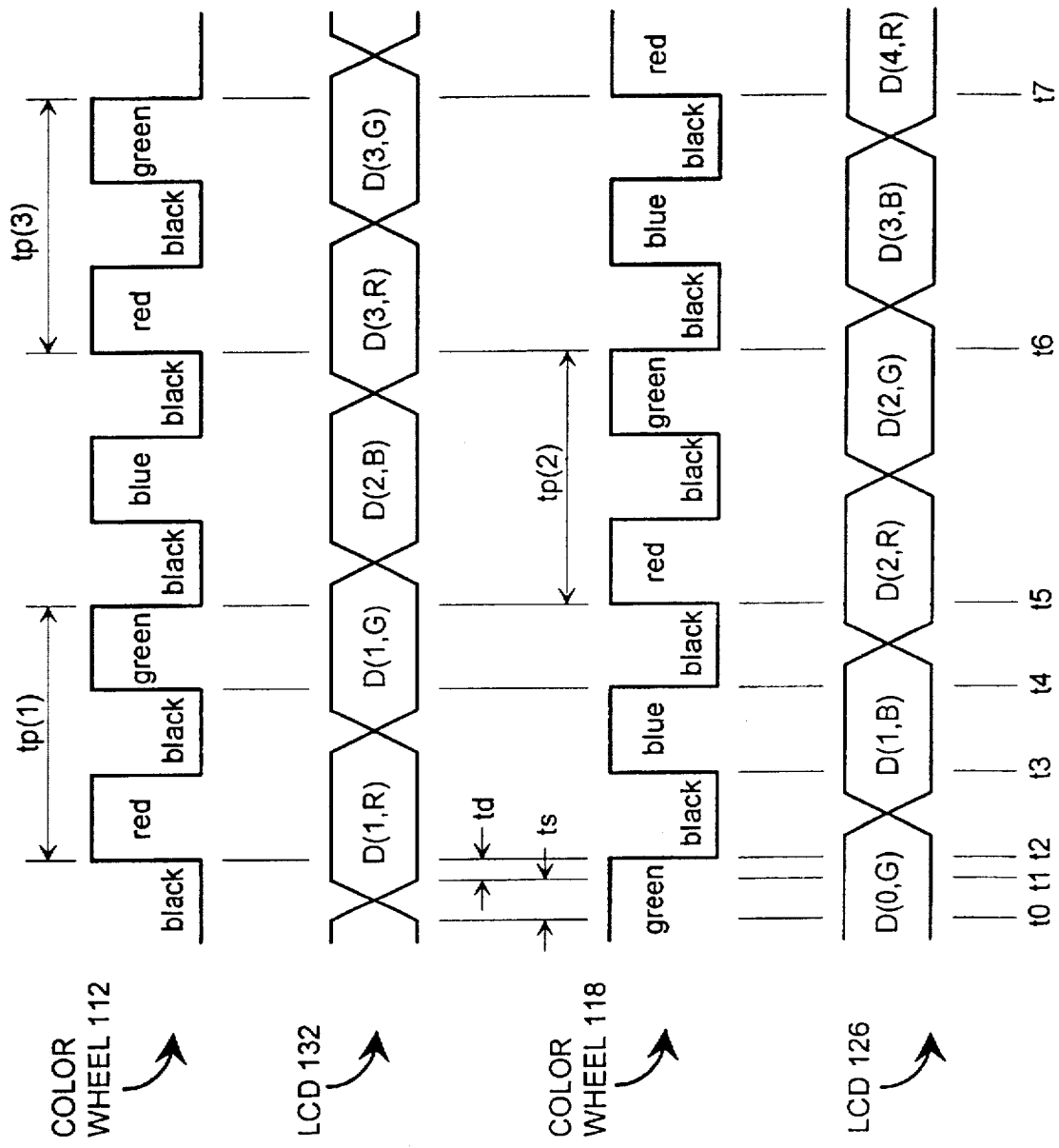
FIG. 10 illustrates, as examples, timing diagrams for both color wheels and both LCDs of the color projection system depicted in FIG. 5.

FIG. 10 illustrates, as examples, timing diagrams indicating at corresponding times, the window positions of the two color wheels, 112 and 118, relative to their respective optical paths, 117 and 119, and the data being displayed on the two monochrome active matrix LCDS, 132 and 126. In the following description, the data being displayed on the two monochrome active matrix LCDs, 132 and 126, is indicated by two parameters in parentheses. The first parameter is a frame indicator, and the second parameter is a color indicator.

In its preferred embodiment, the color projection system 100 projects color images onto the display screen 102 at the rate of 20 frames per second. Each frame of color images is generated by combining red, green, and blue color images from the two combinations of color wheel assemblies and monochrome active matrix LCDs. For example, within the duration of each frame (e.g., tp(1), tp(2), or tp(3)), one of the color wheel assembly and monochrome active matrix LCD combinations (e.g., 132 and 112) generates the red color images to be projected for that frame, then shortly thereafter, the other color wheel assembly and monochrome active matrix LCD combination (e.g., 126 and 118) generates the blue color images to be projected for that frame, then shortly thereafter, the first color wheel assembly and monochrome active matrix LCD combinations (e.g., 132 and 112) generates the green color images to be projected for that frame, to complete the projection of that frame.

In particular, before time t0, for example, the red data for a first frame, D(1,R), is provided to the display drivers 136 of the monochrome active matrix LCD 132 by the display controller 138, in response to RGB, HSYNC, and VSYNC signals received from, for example, a video or graphics controller (not shown). The red data in this case, indicates the pixels (hereinafter referred to as the pixels corresponding to the color red) of the monochrome active matrix LCD 132 which are to be transparent (i.e., turned on) so that reflected light will pass through them and through the red window 115-1 of the color wheel 114 when the red window 115-1 is subsequently interposed into the optical path 117.

Between times t0 and t2, the display drivers 136 of the monochrome LCD 132 are turning on the pixels of the monochrome LCD 132 corresponding to the color red. These pixels are not projected onto the display screen 102, however, since the opaque, black portion 115-2 of the color wheel assembly 112 is interposed into the optical path 117 during this time. During this time, what is being projected onto the display screen 102 are the pixels of the monochrome LCD 126 corresponding to the color green for a previous frame.

By the time t2, the pixels of the monochrome LCD 132 corresponding to the color red are fully transparent (e.g., fully turned on). In particular, if the turn on response time of the pixels of the monochrome LCD 132 is "ts" seconds, then the pixels of the monochrome LCD 132 corresponding to the color red are fully turned on by a time t1 equal to (t0+ts). Also, before time t2, the blue data for the first frame, D(1,B), is provided to the display drivers 130 of the monochrome active matrix LCD 126 by the display controller 138, in response to the RGB, HSYNC, and VSYNC signals received from, for example, the video or graphics controller (not shown). The blue data, in this case, indicates for the same first frame, the pixels corresponding to the color blue of the monochrome active matrix LCD 126 which are to be transparent (i.e., turned off, since the monochrome LCD 126 has reversed polarizers) so that reflected light will pass through them and through the blue window 121-5 of the color wheel 120 when the blue window 121-5 is subsequently interposed into the optical path 119.

Between times t2 and t3, the red window 115-1 of the color wheel assembly 112 is interposed into the optical path 117 so that the fully turned on pixels corresponding to the color red of the monochrome LCD 132 are projected onto the display screen 102 for the first frame. Meanwhile, the display drivers 130 of the monochrome LCD 126 are turning off (i.e., making transparent) the pixels of the monochrome LCD 126 corresponding to the color blue. These pixels are not projected onto the display screen 102, however, since the opaque, black portion 121-4 of the color wheel assembly 118 is interposed into the optical path 119 during this time.

By the time t3, the pixels of the monochrome LCD 126 corresponding to the color blue are fully transparent (e.g., fully turned off). Also, before time t3, the green data for the first frame, D(1,G), is provided to the display drivers 136 of the monochrome active matrix LCD 132 by the display controller 138, in response to the RGB, HSYNC, and VSYNC signals received from, for example, the video or graphics controller (not shown). The green data, in this case, indicates for the same first frame, the pixels corresponding to the color green of the monochrome active matrix LCD 132 which are to be transparent (i.e., turned on) so that reflected light will pass through them and through the green window 115-3 of the color wheel 114 when the green window 115-3 is subsequently interposed into the optical path 117.

Between times t3 and t4, the blue window 121-5 of the color wheel assembly 118 is interposed into the optical path 119 so that the fully turned on pixels corresponding to the color blue of the monochrome LCD 126 are projected onto the display screen 102 for the first frame. Meanwhile, the display drivers 136 of the monochrome LCD 132 are turning on (i.e., making transparent) the pixels of the monochrome LCD 132 corresponding to the color green. These pixels are not projected onto the display screen 102, however, since the opaque, black portion 115-6 of the color wheel assembly 112 is interposed into the optical path 117 during this time.

By the time t4, the pixels of the monochrome LCD 132 corresponding to the color green are fully transparent (e.g., fully turned on). Also, before time t4, the red data for the second frame, D(2,R), is provided to the display drivers 130 of the monochrome active matrix LCD 126 by the display controller 138, in response to the RGB, HSYNC, and VSYNC signals received from, for example, the video or graphics controller (not shown). The red data, in this case, indicates for the second frame, the pixels corresponding to the color red of the monochrome active matrix LCD 126 which are to be transparent (i.e., turned off) so that reflected light will pass through them and through the red window 121-1 of the color wheel 120 when the red window 121-1 is subsequently interposed into the optical path 119.

Between times t4 and t5, the green window 115-3 of the color wheel assembly 112 is interposed into the optical path 117 so that the fully turned on pixels corresponding to the color green of the monochrome LCD 132 are projected onto the display screen 102 for the first frame. Meanwhile, the display drivers 130 of the monochrome LCD 126 are turning off (i.e., making transparent) the pixels of the monochrome LCD 126 corresponding to the color red for the next frame (i.e., second frame). These pixels are not projected onto the display screen 102, however, since the opaque, black portion 121-6 of the color wheel assembly 118 is interposed into the optical path 119 during this time.

Between times t5–t6, a second color frame is projected onto the display screen 102 by the color projection system 100 in a similar fashion as described in reference to the first color frame between times t0 and t5. One difference, however, is that the color images projected from the monochrome LCDS, 132 and 126, are reversed. In particular, for odd frames, the red and green images are projected from the display of the monochrome LCD 132, and the blue images from the display of the monochrome LCD 126, and for even frames, the red and green images are projected from the display of the monochrome LCD 126, and the blue images from the display of the monochrome LCD 132.

As illustrative examples, assuming a frame rate of 20 frames per second, the time period for each frame (e.g., tp(1), tp(2) or tp(3)) would be approximately 50 milliseconds, and the time period for each color window to be interposed into its corresponding optical path (e.g., t2 to t3) would be approximately 16.7 milliseconds. Assuming a pixel turn on response time of 12 milliseconds, then the times "ts"and "td" as defined in reference to FIG. 10 would be approximately 12 and 4.7 milliseconds, respectively.

Although the various aspects of the present invention have been described with respect to a preferred embodiment, it will be understood that the invention is entitled to full protection within the full scope of the appended claims.

What is claimed is:

1. A color projection system comprising:
    means for projecting optically received images;
    means including a first LCD having a first plurality of monochrome pixels, for optically transmitting over a first optical path extending from said first LCD to said projecting means, monochrome images displayed on said first plurality of monochrome pixels of said first LCD;
    means including a second LCD having a second plurality of pixels, for optically transmitting over a second optical path extending from said second LCD to said projecting means, monochrome images displayed on said second plurality of monochrome pixels of said second LCD;
    means for interposing a first repetitive sequence of red, green and blue colored windows into said first optical path such that said optically transmitted monochrome images displayed on said first plurality of monochrome pixels of said first LCD are converted into corresponding color images to be received by said projecting means, means for interposing a second repetitive sequence of red, green and blue windows, 180 degrees out of phase with said first repetitive sequence, into said second optical path such that said optically transmitted monochrome images displayed on said second plurality of monochrome pixels of said second LCD are converted into corresponding color images to be received by said projecting means;

means responsive to an RGB signal, for activating selected ones of said first plurality of pixels of said first LCD corresponding to the color of the window being interposed into said first optical path by said first repetitive sequence interposing means, and selected ones of said second plurality of pixels of said second LCD corresponding to the color of the window being interposed into said second optical path by said second repetitive sequence interposing means; and means for aligning the optically transmitted monochrome images displayed on said first plurality of pixels of said first LCD and the optically transmitted monochrome images displayed on said second plurality of pixels of said second LCD, wherein said aligning means includes an angled sheet of transparent material interposed into said first optical path.

2. The color projection system as recited in claim 1, wherein said means for optically transmitting monochrome images displayed on said first plurality of monochrome pixels of said first LCD, and said means for optically transmitting monochrome images displayed on said second plurality of monochrome pixels of said second LCD include a lamp radiating light.

3. The color projection system as recited in claim 2, further comprising a polarizing prism positioned such that a portion of the light radiating from said lamp is passed to and reflected back from said first LCD, and another portion of the light radiating from said lamp is passed to and reflected back from said second LCD.

4. The color projection system as recited in claim 3, wherein the reflected back light from said first LCD follows said first optical path, and the reflected back light from said second LCD follows said second optical path.

5. The color projection system as recited in claim 1, wherein said means for interposing a first repetitive sequence of red, green and blue colored windows into said first optical path includes a first color wheel driven by a first motor at approximately 60 rotations per second.

6. The color projection system as recited in claim 5, wherein said means for interposing a second repetitive sequence of red, green and blue colored windows, 180 degrees out of phase with said first repetitive sequence, into said second optical path includes a second color wheel driven by a second motor at approximately 60 rotations per second.

7. A method of projecting color images onto a display screen, comprising synchronizing, in response to an RGB signal, the act first and second liquid crystal displays with the position of red, green and blue windows of respectively corresponding first and second color wheels such that the red, green and blue windows of the first color wheel interposes a first optical path through which images on said first liquid crystal display are projected in such a manner as to form a sequence that is 180 degrees out of phase with a sequence formed by the red, green and blue windows of the second color wheel interposing a second optical path through which said images on said second liquid crystal display are projected, and aligning the optically transmitted monochrome images displayed on said pixels of said first liquid crystal display and the optically transmitted monochrome images displayed on said pixels of said second liquid crystal display using an angled sheet of transparent material interposed into said first optical path.

8. A method of projecting color images, comprising the steps of: optically transmitting over a first optical path extending from a first LCD to a projecting means, monochrome images displayed on a first plurality of monochrome pixels of said first LCD.

interposing a first repetitive sequence of red, green, and blue colored windows into said first optical path such that said optically transmitted monochrome images displayed on said first plurality of monochrome pixels of said first LCD are converted into corresponding color images to be received by said projecting means;

optically transmitting over a second optical path extending from a second LCD to said projecting means, monochrome images displayed on a second plurality of monochrome pixels of said second LCD;

interposing a second repetitive sequence of red, green and blue windows, 180 degrees out of phase with said first repetitive sequence, into said second optical path such that said optically transmitted monochrome images displayed on said second plurality of monochrome pixels of said second LCD are converted into corresponding color images to be received by said projecting means;

activating, in response to an RGB signal, selected ones of said first plurality of pixels of said first LCD corresponding to the color of the window being interposed into said first optical path at the time of such activating and selected ones of said second plurality of pixels of said second LCD corresponding to the color of the window being interposed into said second optical path at the time of such activating; and projecting the optically received images transmitted over said first and second optical paths onto a display screen; and aligning with respect to each other, the optically received images transmitted over said first and second optical paths wherein said optically aligning step comprises interposing a sheet of transparent material into said first optical path, and adjusting the angle of said sheet of transparent material with respect to said first optical path until the optically received images transmitted over said first and second optical paths are aligned with respect to each other.

* * * * *